Oct. 12, 1948.　　　　E. W. REMBERT　　　2,451,046
METHOD OF COUPLING PIPE
Filed Sept. 20, 1944　　　　　　　　　　　　2 Sheets-Sheet 1
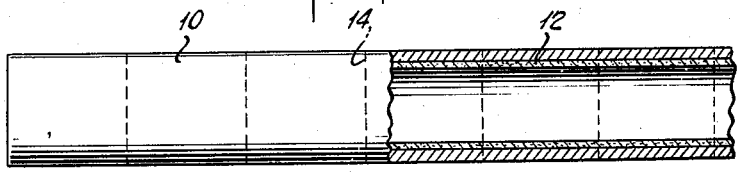
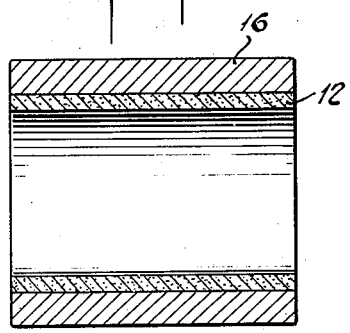　　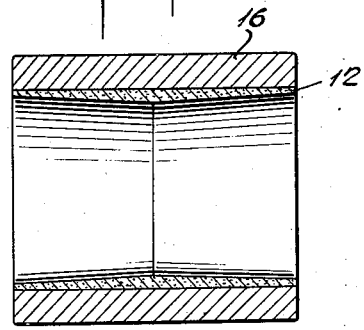
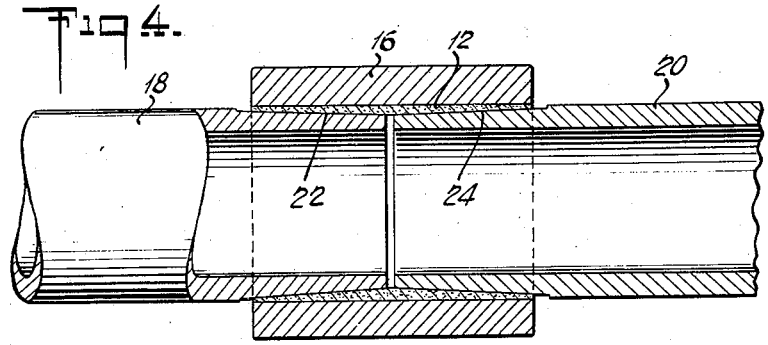
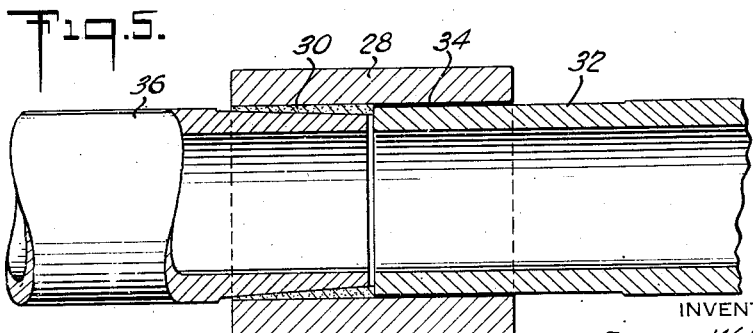
INVENTOR
ERNEST W. REMBERT.
BY Virgil C. Kline
ATTORNEY

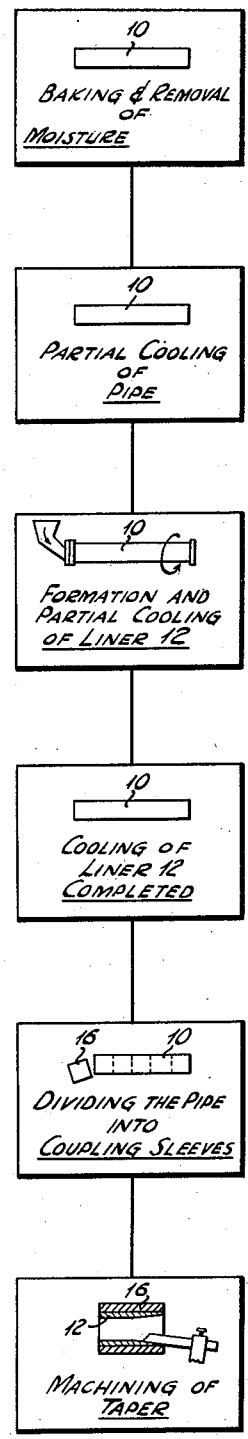

Patented Oct. 12, 1948

2,451,046

UNITED STATES PATENT OFFICE 2,451,046

METHOD OF COUPLING PIPE

Ernest Wayne Rembert, Hinsdale, Ill., assignor to Johns-Manville Corporation, New York, N. Y., a corporation of New York Application September 20, 1944, Serial No. 554,882

4 Claims. (Cl. 18—59)

The instant invention relates to a pipe coupling adapted for use with many types of pipe, for example, steel or iron pipe, but particularly applicable for coupling pipes or pipe sections composed of a hardened, compressed, asbestos-cement composition and is a division of my co-pending application, S.N. 458,925, now Patent No. 2,379,990, reissued as Patent No. 22,782, filed September 19, 1942.

The principal object of the invention is the provision of an improved coupling finding a principal field of use in sewer systems for the handling of domestic wastes. More particularly, the invention has for an object the provision of such coupling which may be readily assembled in the field with a minimum of equipment and which will be leak-proof under service conditions.

Another object of the invention is the provision of a coupling and method of assembly which eliminates the necessity of pouring the joint in the field.

Another object of the invention is the provision of a coupling including a sleeve having a thin tapered liner of asphalt, or the like, in cooperative sealing relationship with a tapered pipe end. Heretofore, it has been proposed to construct joints, particularly joints of the bell and spigot type, by moulding a liner within the bell for engagement with the pipe. The moulding operations have necessarily required the sleeve to have a minimum thickness of ¼ to ⅜" in order that satisfactory distribution of the material and the elimination of excessive quantities of air could take place. Such prior proposals have not provided a joint of the required strength due to the thickness of the asphalt layer. As will be understood, the strength of a joint of this type is a definite function of the thickness of the asphalt material. A further object of the invention is the provision of a joint and its constituent parts and the method of making them, employing a tapered sleeve liner of such minimum thickness that flexibility of the joint is retained, but a very substantial increase in strength over the prior proposals results.

My invention will be more fully understood and further objects and advantages thereof will become apparent when reference is made to the more detailed description which is to follow and to the accompanying drawings, in which:

Fig. 1 is a view, partially in elevation and partially in section, of a tubular section employed in the formation of coupling sleeves in accordance with the invention;

Fig. 2 is a sectional view through a coupling sleeve in one stage of its manufacture;

Fig. 3 is a sectional view, similar to Fig. 2, illustrating a completed coupling sleeve;

Fig. 4 is a view, partially in elevation and partially in section, of an assembled coupling in accordance with the invention;

Fig. 5 is a view, similar to Fig. 4, depicting a modification of the coupling; and Fig. 6 is a flow sheet outlining the steps employed in the instant method.

Referring now to the drawings, there is illustrated in Fig. 1 a section of pipe or conduit 10 of indefinite length to be employed in the manufacture of coupling sleeves for the coupling assemblies later described. Conduit 10 may be made of cast iron, steel, or other conventional material employed for such purposes, but is preferably composed of a hardened, compressed, asbestos-cement composition. The conduit is selected to have an inner diameter somewhat greater than the outer diameter of the pipes to be coupled. The inner surface of conduit 10 is coated with a primer of any conventional type, and the conduit is then placed in an oven and baked, say, for 24 hours at 250° F. to drive out any contained moisture. The ends of the conduit section are then closed, for example, by metal end blocks, one or both of which have a central opening, and after cooling, the section is placed on rolls and rotated at a speed, say, of 100 to 200 R. P. M. An asphalt or other thermo-plastic material suitable for forming a sleeve lining is poured in a molten condition into the conduit section through the hole or holes provided in the end blocks. The thermo-plastic material may comprise asphalt having a melt point, say, of the order of 200 to 250° F. As a specific example, unfilled asphalt of 225° F. melt point has been found particularly suitable. However, it will be understood that other materials may be employed; for example, other asphalts, coal tar pitches, thermo-plastic resins, and the like.

Sufficient of the thermo-plastic liner material is introduced into the conduit section to provide a layer of a maximum thickness somewhat greater than the distance between the inner wall of the sleeve and the outer tapered end of a pipe section to be coupled thereby. During rotation of the conduit section, the asphalt or other liner material is forced out by centrifugal force to form a uniform thickness layer over the entire inner surface of the conduit section. The layer of thermo-plastic material molded by centrifugal force has been found to be substantially free from air bubbles and the like. After the desired amount of material is introduced, rotation is continued until the asphalt is cooled sufficiently to prevent slumping or flowing. The conduit section defining a plurality of coupling sleeves is illustrated at this stage in Fig. 1, the uniform thickness liner being indicated at 12.

The conduit section, preferably after the liner is completely cooled, is divided, by a saw or the like, on the dotted lines 14 of Fig. 1, into a plurality of individual sleeves. The coupling sleeves at this stage of their manufacture are illustrated in Fig. 2 by reference character 16. Each individual sleeve 16, with its internal layer or liner 12, is then placed in a suitable device, say a lathe, and the liner machined to have a minimum, but appreciable, thickness adjacent its ends tapering to a maximum thickness adjacent the center of the sleeve as illustrated in Fig. 3. Preferably the minimum thickness is of the order of $\frac{1}{16}$ to $\frac{1}{8}$ inch. It will be understood that the inner diameter of the liner adjacent the ends of the sleeve, where the sleeve is of minimum thickness, is preferably slightly less than the outer diameter of the pipe section to be inserted therein. The machining operation is controlled to provide a smooth, uniform, sloping surface free, as far as possible, from pits, grooves, and the like.

Referring now particularly to Fig. 4, a coupling assembly employing a sleeve 16 will be described. In preparation for making the assembly, pipe sections 18 and 20, which are to be coupled together, have their ends machined to define tapers 22 and 24, respectively. Tapers 22 and 24 are each preferably of a length substantially equal to one-half the length of the coupling sleeve and are complementary to the tapered portions of the sleeve. Pipe sections 18 and 20 may be made of cast iron, steel, or other such conventional materials, but, similarly as the conduit employed for the sleeves, are preferably composed of a hardened, compressed, asbestos-cement composition, inasmuch as the invention finds a principal field of use in connection with pipe of this character. A machining operation may be carried out on such asbestos-cement materials, as well as upon iron and steel pipe, to provide a smooth surface for contact with the smooth surface of the liner.

In assembling the coupling, the tapered portions of the pipe sections and of the coupling sleeve liner are primed with a suitable primer, such as an asphalt cut-back with benzol or other solvent, benzol being preferred. The coupling sleeve 16 is then placed over the end of one pipe section and pressed firmly home with a twisting or rotary motion to bring the complementally tapered portions of the pipe section and liner into close sealing engagement. The second pipe section is then placed with its tapered end portion in the coupling sleeve and similarly pressed home with a twisting or rotary motion to likewise bring the contiguous surface of the liner and pipe section into close sealing engagement. Upon completion of the above steps and the lapse of sufficient time to allow the escape of the solvent from the priming material and for the liner to thoroughly harden, the coupling is ready for use.

A coupling of the type described above has been found to be particularly satisfactory in connecting sewer lines for the handling of domestic wastes and the like, inasmuch as it is leak-proof under service conditions and may be readily assembled in the field. Owing to the manner in which the sleeve liner is prepared, namely, by flowing of material into the rotating sleeve and then, after hardening, machining the liner to exact dimensions, it has the desired thinness at the sleeve ends, whereby an appreciable flexibility is preserved and a very strong serviceable joint is obtained. Both the pipe sections and the sleeves are prepared at the factory, the field assembly requiring practically no equipment or any great degree of skill. It will be understood that in the shipping and handling of the coupling sleeves, sufficient care must be employed to prevent damage to the lining of asphalt or other thermo-plastic material.

Referring now to Fig. 4, a somewhat modified form of the invention is disclosed. In this embodiment, sleeve 28 is provided with a tapered liner 30 on one side only. The liner is preferably formed similarly as above, although in this case each sleeve is individually made and the lining material controlled to extend over the interior surface of only a portion of the sleeve, say one-half, as shown in Fig. 5. In the machining operation the liner is uniformly tapered to have a minimum thickness at one end, the end adjacent the end of the sleeve, and a maximum thickness at the other end. The sleeve 28 is permanently attached to one pipe section 32 as by an adhesive 34, while at the factory. In assembling the coupling on the job, the other pipe section 36, including a tapered end portion as in the other form, is inserted into the open end of the sleeve with a twisting or rotary motion to bring the adjacent surfaces of the liner and the sleeve into close sealing contact.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A method of forming a coupling sleeve comprising introducing a molten thermoplastic material within a tubular member, rotating said tubular member to distribute said thermoplastic material in a substantially uniform thickness layer to form a liner, cooling and setting said thermoplastic material, dividing said tubular member into a plurality of sleeves, and shaping the liner within said sleeves to define tapers extending substantially uniformly from a minimum thickness adjacent the ends thereof to a maximum thickness adjacent the center thereof.

2. A method of forming a coupling sleeve comprising introducing a molten asphalt within a tubular member, rotating said tubular member to distribute said asphalt in a substantially uniform thickness layer to form a liner for said tubular member, cooling and setting said asphalt, dividing said tubular member into a plurality of individual sleeves, and machining the liner within said sleeves to define tapers extending from a minimum thickness of the order of $\frac{1}{16}$ to $\frac{1}{8}$ inch adjacent the ends of the sleeves to a maximum thickness adjacent the center thereof.

3. A method of forming a coupling sleeve from a section of asbestos-cement pipe comprising priming the inner surface of said pipe, baking said pipe to remove moisture therefrom, and partially cooling the same, introducing a molten thermoplastic material within said pipe, and rotating the pipe to distribute the molten thermoplastic material in a substantially uniform thickness layer to form a liner, cooling and setting said molten thermoplastic material, dividing the pipe into a plurality of tubular sleeves, and machining the liner within said sleeves to define tapers extending substantially uniformly from a minimum thickness adjacent the ends of the sleeves to a maximum thickness adjacent the center thereof.

4. A method of forming a coupling sleeve comprising priming the inner surface of a tubular sleeve, baking the sleeve to remove moisture therefrom and partially cooling the same, introducing a molten, thermoplastic material into the sleeve, rotating the sleeve to distribute the molten, thermoplastic material in a substantially uniform thickness layer on the inner wall of the sleeve to form a liner, cooling and setting the thermoplastic material, and machining the liner within the sleeve to define a taper extending from a minimum thickness at an end of the sleeve to a maximum thickness intermediate the ends thereof.

ERNEST WAYNE REMBERT.

REFERENCES CITED

The following references are of record in the file of this patent:

UNITED STATES PATENTS

| Number | Name | Date |
|---|---|---|
| 656,192 | Howard | Aug. 21, 1900 |
| 1,979,470 | Johnston | Nov. 6, 1934 |
| 2,088,470 | Freedlander | July 27, 1937 |
| 2,285,046 | Murdock | June 2, 1942 |
| 2,342,556 | Rockoff | Feb. 22, 1944 |
| 2,349,549 | Hardman et al. | May 23, 1944 |
| 2,353,194 | Sherman et al. | July 11, 1944 |